United States Patent
Gupta

(10) Patent No.: US 7,215,360 B2
(45) Date of Patent: May 8, 2007

(54) ERROR PROPAGATION TREE TECHNOLOGY

(75) Inventor: Jimmy Rohit Gupta, Burlington, NJ (US)

(73) Assignee: Triveni Digital, Inc., Princeton Junction, NJ (US)

( * ) Notice: Subject to any disclaimer, the term of this patent is extended or adjusted under 35 U.S.C. 154(b) by 758 days.

(21) Appl. No.: 10/116,070

(22) Filed: Apr. 5, 2002

(65) Prior Publication Data

US 2002/0158969 A1   Oct. 31, 2002

Related U.S. Application Data

(60) Provisional application No. 60/281,804, filed on Apr. 6, 2001.

(51) Int. Cl.
*H04N 17/00* (2006.01)
*G06F 11/00* (2006.01)
*G01R 15/00* (2006.01)

(52) U.S. Cl. .............. 348/180; 348/184; 348/192; 714/25; 714/48; 714/799; 702/57

(58) Field of Classification Search .............. 348/180, 348/184, 185, 192; 702/57, 66–70; 382/207, 382/224–227; 714/25, 47, 48, 799, 820; 707/104.1
See application file for complete search history.

(56) References Cited

U.S. PATENT DOCUMENTS

| | | | | |
|---|---|---|---|---|
| 4,552,718 A * | 11/1985 | Impink et al. | .............. | 376/216 |
| 4,750,106 A * | 6/1988 | Aiken, Jr. | ............ | 714/5 |
| 4,783,730 A * | 11/1988 | Fischer | ............ | 710/5 |
| 4,872,167 A * | 10/1989 | Maezawa et al. | .............. | 714/38 |
| 5,230,047 A * | 7/1993 | Frey et al. | .............. | 714/4 |
| 5,297,150 A * | 3/1994 | Clark | ............ | 714/26 |
| 5,392,289 A * | 2/1995 | Varian | ............ | 714/707 |
| 5,631,977 A * | 5/1997 | Koshi et al. | .............. | 382/239 |
| 5,666,480 A * | 9/1997 | Leung et al. | ............ | 714/1 |
| 5,805,578 A * | 9/1998 | Stirpe et al. | ............ | 370/255 |
| 5,940,083 A * | 8/1999 | Broekhuijsen | .............. | 345/442 |
| 5,941,955 A * | 8/1999 | Wilby et al. | .............. | 709/242 |
| 6,128,016 A * | 10/2000 | Coelho et al. | .............. | 715/808 |
| 6,141,767 A * | 10/2000 | Hu et al. | ............ | 714/1 |
| 6,144,773 A * | 11/2000 | Kolarov et al. | .............. | 382/240 |
| 6,253,339 B1 * | 6/2001 | Tse et al. | ............ | 714/47 |
| 6,275,801 B1 * | 8/2001 | Novak et al. | .............. | 704/252 |
| 6,353,902 B1 * | 3/2002 | Kulatunge et al. | .......... | 714/712 |
| 6,499,117 B1 * | 12/2002 | Tanaka | .............. | 714/49 |
| 6,707,474 B1 * | 3/2004 | Beck et al. | ............ | 715/771 |
| 6,725,235 B1 * | 4/2004 | Dyer et al. | .............. | 707/104.1 |
| 6,725,405 B2 * | 4/2004 | Batten et al. | .............. | 714/724 |
| 6,751,343 B1 * | 6/2004 | Ferrell et al. | ............ | 382/145 |
| 6,816,993 B1 * | 11/2004 | Furuyama | .............. | 714/747 |
| 6,829,299 B1 * | 12/2004 | Chujoh et al. | .............. | 375/240 |
| 6,848,078 B1 * | 1/2005 | Birsan et al. | .............. | 715/511 |

* cited by examiner

*Primary Examiner*—Victor R. Kostak
(74) *Attorney, Agent, or Firm*—Birch, Stewart, Kolasch & Birch, LLP

(57) ABSTRACT

A method and system for providing condition information associated with an entity being analyzed. The method includes presenting nodes corresponding to components of the entity according to a tree-like configuration, and providing condition information associated with at least one of the components using the nodes.

29 Claims, 16 Drawing Sheets

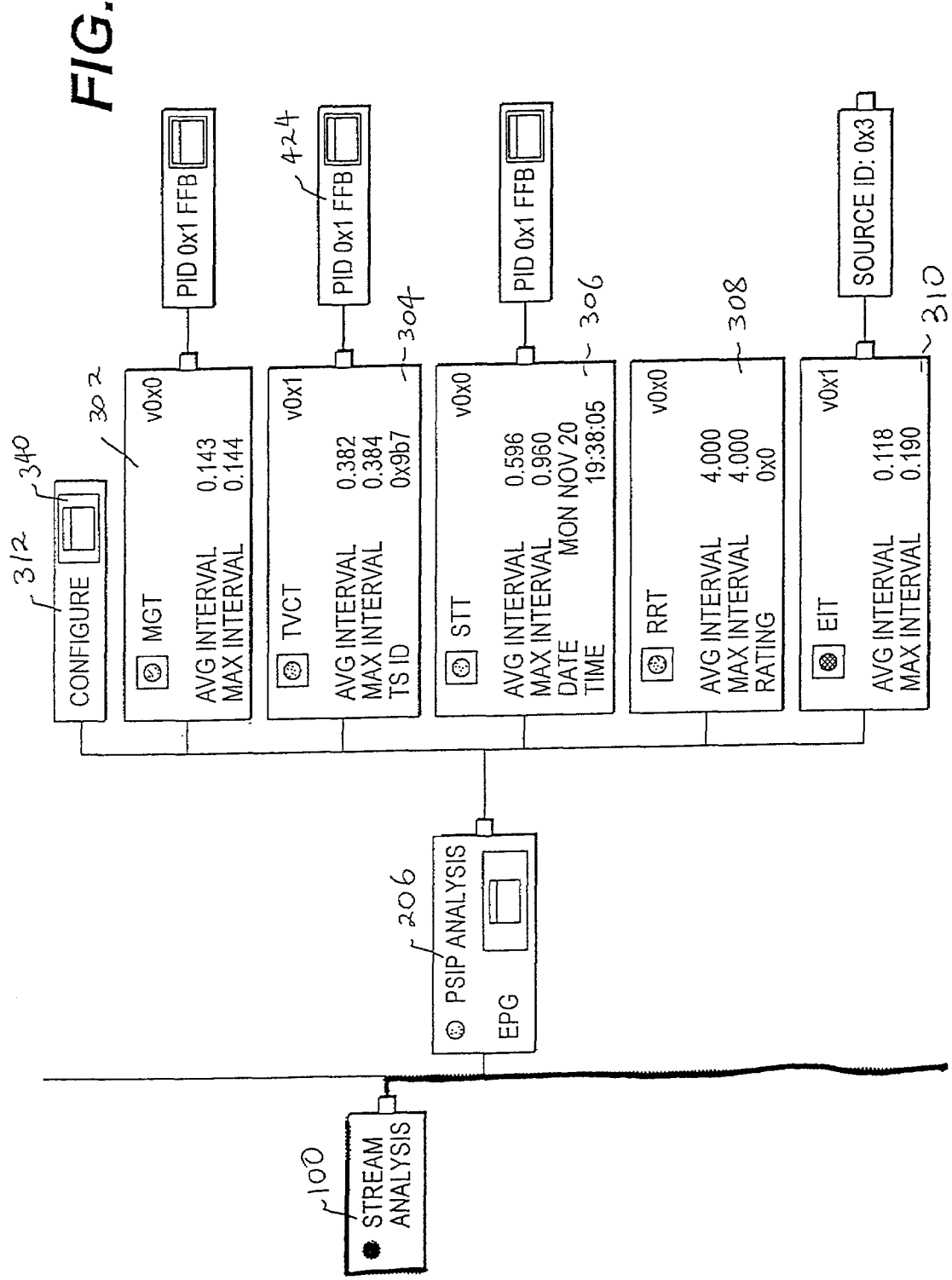

ERROR PROPAGATION TREE TECHNOLOGY

The present application claims priority benefit of U.S. Provisional Application No. 60/281,804 filed on Apr. 6, 2001, the entire content of which is herein fully incorporated by reference.

BACKGROUND OF THE INVENTION

1. Field of the Invention

The invention relates to a technique of displaying condition information, and more particularly to a technique of displaying condition information at varying levels of granularity using a tree-like structure, which is usable to analyze a system or signal such as in a digital television environment.

2. Discussion of the Related Art

Television stations are integrating digital television (DTV) broadcasting equipment with their existing analog broadcasting equipment. Such DTV broadcasting equipment is very different than analog broadcasting equipment. The operators of the television stations need a way to verify that their digital broadcast signal, i.e., multiplex or data stream, is within standards described by the American Television Standards Commission (ATSC) or any other applicable standard. This is a non-trivial task because it is difficult to understand and interpret such data streams.

A data stream in a DTV broadcast environment is very complex and is generated by a battery of equipment such as encoders, PSIP generators, data servers, MPEG2 packet generators, multiplexers, etc. Much of this equipment is not only new to the broadcasters, but also new to the equipment vendors. As a result, broadcasts are often out of compliance with the relevant standards, so that many DTV receivers cannot receive them correctly.

Furthermore, it is not easy for broadcasters to determine whether or not their data stream is correct, even if they have an instrument that allows them to examine properties of the stream. Most users have great difficulty using existing stream monitoring and analysis tools because of their complexity and non-intuitive user interface.

An example of such an instrument is the stream analyzer manufactured and marketed by SENCORE. This instrument includes a few warning lights that are associated with very little explanatory information. A very practiced user of this instrument may debug error conditions in the data stream based upon his familiarity with the conditions that the warning lights might represent. But an average user generally has no idea how to get to the root of a problem reported by the warning lights.

To compound the difficulty of such analysis, it typically has to be performed under urgent circumstances, e.g., where the error is effectively disabling reception of the data stream by most of the would-be viewers. Therefore, there is a need for a technique of quickly detecting and analyzing the conditions of a system/product, which overcome these problems associated with the related art.

SUMMARY OF THE INVENTION

Accordingly, the present invention provides a system and method for effectively communicating condition information which obviate the disadvantages and problems associated with the related art.

The invention, in part, is a recognition that automated error detection and analysis for the data stream is needed, as well as an intuitive display of information representing the analysis.

The invention, also in part, is a recognition that users of such automated error detection and analysis equipment also need a dialog window in the intuitive display to set thresholds of various types and have automatic detection of threshold violations in order to manage their bandwidth carefully.

The invention, also in part, is a recognition that analysis of a data stream or DTV multiplex can be broken into two categories: individual stream component analysis (Audio, Video, PSIP, MPEG2, and Data) and cross component analysis (Auto Triggering, Statistics, Cross Table Analysis, AI).

According to the present invention, various components of a system, product or signal are depicted on an Error Propagation Tree (EPT) in order to present them to the user in an intuitive and easily-comprehended manner. In the present invention, an EPT is preferably dynamic in that nodes can be added or removed in real or almost real time as circumstances change; however, static EPT may be used if desired.

According to an embodiment of the present invention, an EPT is a type of tree that depicts the state of a branch of the tree by (recursively) examining the state of its children (branches and leaves). This allows a user to quickly traverse the tree to identify the problem without immediately being confronted with information overload. Information about the branch becomes more specific, i.e., a finer level of granularity is presented, as one traverses more deeply into the tree. The EPT can selectively be expanded or contracted to reveal a greater or lesser number of branches/leaves. Selected leaves and/or branches can open a hook window containing the same or more finely grained information.

According to an embodiment of the present invention, at the most basic or first level, an EPT displays a single node indicating that some sort of error or threshold violation has occurred, e.g., in a DTV multiplex relative to the governing ATSC standard. And an EPT provides a very intuitive way to drill down to get more information about the specific error(s) or violation(s), such as by clicking on parts of the EPT with a pointing device such as a mouse, optical/magnetic pen or touch screen.

In an embodiment, some of the branches/leaves in the EPT represent configuration buttons that when clicked-on open dialog windows in which one or more parameters affecting the information displayed via the corresponding node can be adjusted. A parameter can be a threshold detection level for said parameter or a flag that can be set to activate or deactivate the associated engine for generating the information displayed by the corresponding node.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

FIGS. 2A–5 depict the use of an EPT in one exemplary system (i.e., DTV analysis system) according to an embodiment of the present invention, wherein:

FIG. 2A shows one example of an unexpanded EPT in which a single first level $L_1$ node of the DTV analysis system is displayed according to an embodiment of the present invention;

FIGS. 4A, 4B and 4C together show the EPT of FIGS. 3A–3C in a further expanded form with first, second, third and fourth level ($L_1$, $L_2$, $L_3$ and $L_4$) nodes displayed; and FIG. 5 is a partial image of a display screen including an EPT and an associated hook window according to an embodiment of the invention.

DETAILED DESCRIPTION OF THE PREFERRED EMBODIMENTS

Figure 1:
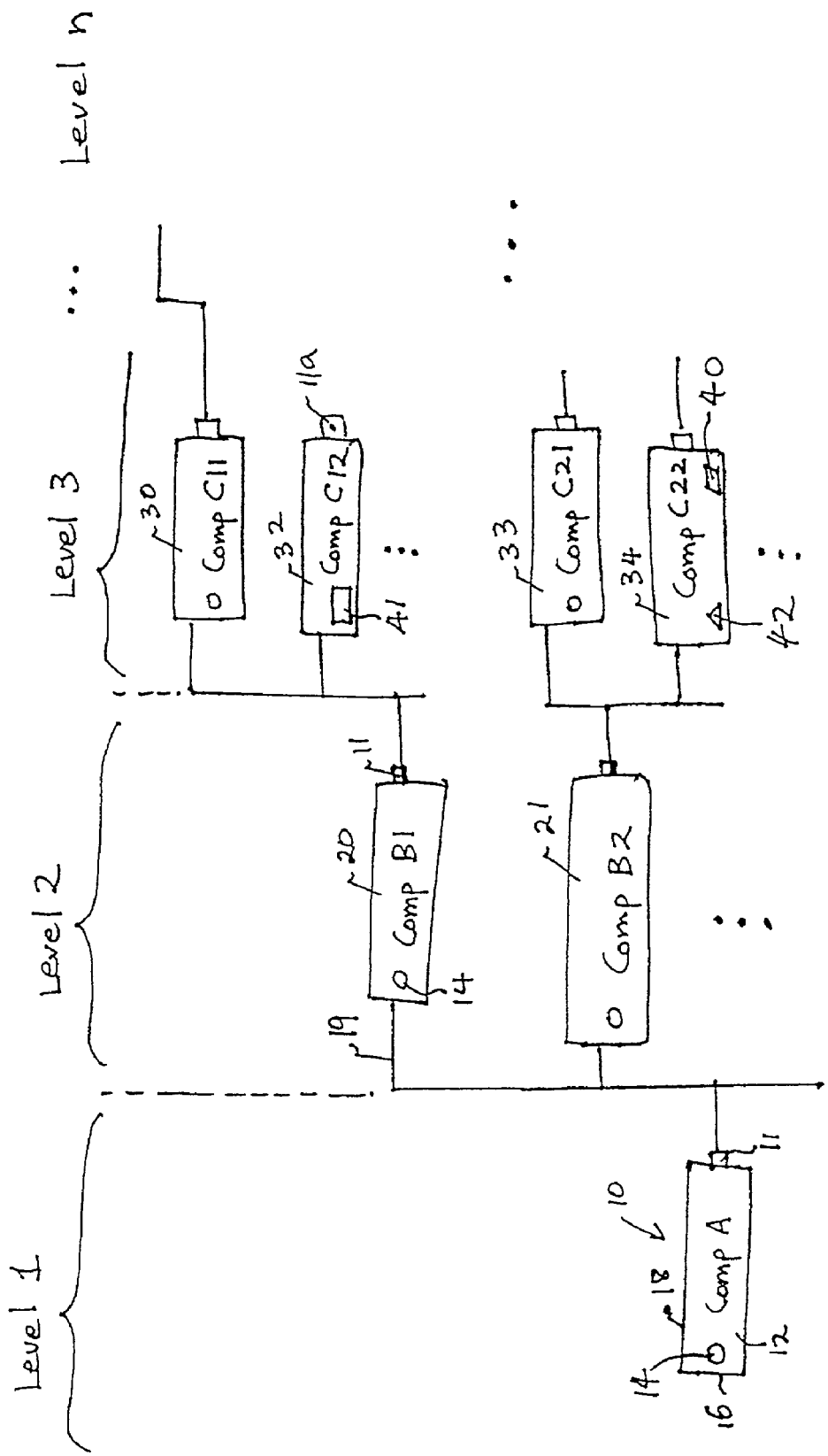
FIG. 1 is a depiction of components of an arbitrary system represented in an Error Propagation Tree (EPT) structure according to an embodiment of the present invention.

FIG. 1 shows a general structure of an EPT applied to represent condition information of components of a certain system according to an embodiment of the present invention. As shown in FIG. 1, various components of the system to be analyzed are presented in an EPT fashion on a display device such as a computer screen. Particularly, at the first level, at least one main component (Component A) is represented as node 10; at the next lower level (second level), sub-components of Component A are represented as nodes 20, 21 . . . and are labeled as Components B1, B2 . . . ; at the next lower level, sub-components of each of Components B1, B2 . . . are represented as nodes 30, 32, 33, 34 . . . and are labeled as Components C11, C12 . . . , C21, C21 . . . In this manner, the main component(s) of the system to be analyzed and any subsequent lower level sub-components of the main components of the system are represented as nodes branching off in a tree-like fashion to form the EPT. At least one of the main components of the system includes a status indicator 14 and an expansion activator 11. Each of the sub-components of the system also includes a status indicator 14, but may or may not include an expansion activator 11 depending on the need and system configuration.

A status indicator 14 indicates the status or condition information of the corresponding node. Any number of different states/conditions may be indicated using the status indicator 14. In one embodiment, the indicator 14 can be configured to include a light emitting diode (LED) or some other mechanism. The indicator 14 can assume different colors to denote any number of different states (e.g., normal or alert states) in lower level nodes of the EPT. For instance, a node taking on a first color, e.g., red, can indicate that an alert condition presently exists in it or a lower level node in the EPT that reports to it, which may connote an error condition in a lower level node in the EPT. A node taking on a second color, e.g., yellow, can indicate that an alert condition arose (in it or a lower node reporting to it) since the last reset of the corresponding indictor 14 but that the alert condition does not presently exist. A node taking on a third color, e.g., green, can indicate that no alert condition has arisen (in it or a lower node reporting to it) since the last reset through and including the present moment. That is, regardless of the number of different states that a status indicator can indicate, the status indicator generally always indicate the highest alert state from the different states of the current node and its lower (child) node(s). In this example, the highest priority alert is the first color (red), then the next highest priority is the second color (yellow) followed by the third color (green). In other words, in order of priority, the first color is highest, the second color is second highest, and the third color is third highest.

Although each indicator 14 in FIG. 1 is depicted to have a circular configuration, the present invention is not limited to such, and the indicator 14 can have any configuration, shape, color, size, etc. In another embodiment, the indication of the indicator 14 is not limited to the use of a color, but can be represented in any other manner. In one example, the shape, size and/or boundary format of each node may change appropriately to depict different condition information of the node. In another example, a particular indication of the indicator 14 can be configured to trigger a display of a separate indicating mechanism or a generation of an audible sound. Particularly, the activation of the indicator 14 in the highest priority alert state may trigger a separate window or icon to pop-up on a screen or a generation of an alarm sound to alert the user of the highest priority alert state. Obviously, other variations are possible.

In an additional or alternative embodiment, certain edges or the body of each node can take on the same color as the corresponding indicator 14 to better communicate the condition information. For instance, the left edge 16 and top edge 18 of a body 12 of each node can take the same color as the indicator 14 of that node.

An expansion activator 11 is used to expand the corresponding node of the EPT to the next lower level nodes, and can be a button, a switch, or any other means. In FIG. 1, each expansion activator 11, in its unexpanded form, is depicted as a square with a dot 11a in the center, but can be depicted in any other matter. The dot denotes that this button, when activated (e.g., with a pointing device, a mouse, a touch screen, etc.) will expand the EPT to display the next lower level nodes. If so expanded, the expansion activator 11 would indicate that the node is in the expanded form and this expansion indication can be made in any manner. For instance, the dot in the center (i.e., as a collapse button) of the expansion activator 11 may not show as in FIG. 1.

In an additional or alternative embodiment, line segments 19 connecting the different nodes can be displayed with the same color(s) as the colors of the associated nodes. In places where line segments 19 are allocated with more than one color, then the color of the highest priority among the allocated colors will be used to color those places of the line segments 19. This will be explained in more detail later referring to an example in FIG. 2A.

In an additional or alternative embodiment, some or all of the nodes may include a hook button or switch 40 that causes a graphics screen, a hook window or some other window to be displayed. Such windows can display additional detailed condition information and/or any other information about the associated node. Also, some or all of the nodes may include a reset button or switch 41 for resetting the status of the associated indicator of the node, and/or a validity indicator 42 which indicates the validity of data being used by an analysis engine to determine the state of the associated node. Given a node with both the status indicator 14 and the validity indicator 42, that status indicator 14 then indicates the combined status of (1) the status of the current node indicated by the validity indicator 42 and (2) the status of its child node(s).

The EPT according to an embodiment of the present invention is dynamic such that any number of nodes and levels can be selectively added or removed and that the existing interconnections between the nodes may be changed selectively in real or non-real time, as circumstances change.

Figure 2A:
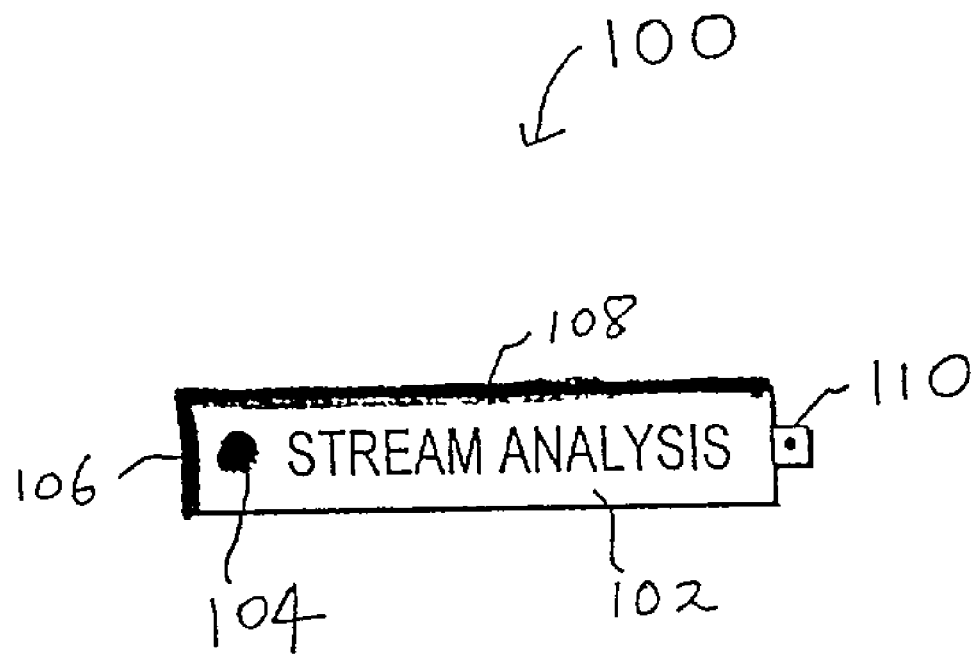

As an example, the EPT in FIG. 1 as applied to analyzing a DTV system according to an embodiment of the present invention will now be discussed referring to FIGS. 2A–5. Particularly, FIG. 2A is a depiction of an unexpanded EPT in which only the first level $L_1$ node or root node 100 is displayed on a display device. The node 100 has the legend "Stream Analysis". The node 100 has a body 102, a status indicator 104 and an expansion activator or button 110 which respectively correspond to a body 12, a status indicator 14, and an expansion activator 11 in FIG. 1.

The indicator 104 assumes different colors to denote normal or alert states in lower level nodes of the EPT. A node taking on a first color, e.g., red, indicates that an alert condition presently exists in it or a lower level node in the EPT (none being depicted in FIG. 2A) that reports to it. A node taking on a second color, e.g., yellow, indicates that an alert condition arose (in it or a lower node reporting to it) since the last reset of the indictor 104 but that the alert condition does not presently exist. A node taking on a third color, e.g., green, can indicate that no alert condition has arisen (in it or a lower node reporting to it) since the last reset through and including the present moment. The highest priority alert is the first color (red), then the next highest priority is the second color (yellow) followed by the third color (green). Similarly, the left edge 106 and top edge 108 of the body 102 of the node 100 take the same color as the indicator 104.

Figure 2B:
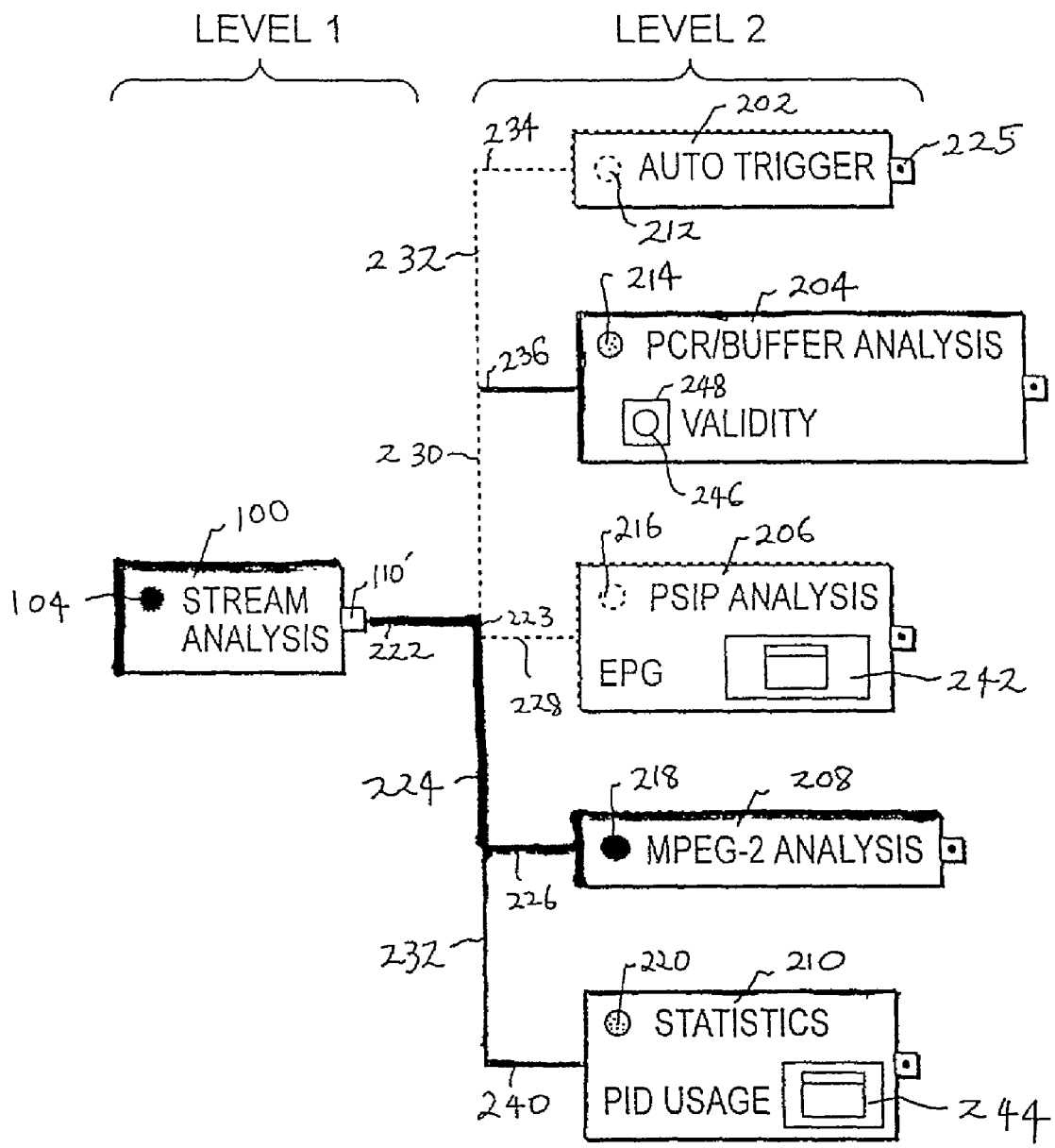
FIG. 2B shows the EPT of FIG. 2A in an expanded form where first and second level ($L_1$ and $L_2$) nodes of the DTV analysis system are displayed according to an embodiment of the present invention.

FIG. 2B is a depiction of the EPT of FIG. 2A in an expanded form with first and second level ($L_1$ and $L_2$) nodes displayed. The first level $L_1$ is depicted in the same manner as in FIG. 2A except for the expansion button 110'. In FIG. 2B, the expansion button 110' is not depicted with a dot in the center to reflect that the EPT has been expanded to show the first and second levels $L_1$ and $L_2$. At a quick glance, FIG. 2B, to a very small extent, may resemble an organizational chart. However, nothing about the known organizational charts suggests the reporting of status alerts from a lower level to a higher level (an aspect of the invention), nor the use of color-keyed connecting lines to help quickly locate the source of the status alert being reported (another aspect of the invention).

The second level $L_2$ in FIG. 2B includes nodes 202, 204, 206, 208 and 210. These nodes include indicators 212, 214, 216, 218 and 220, respectively, that operate like the indicator 104. Each second level node also includes an expansion activator or button 225. The tops and sides (unnumbered for simplicity) of the nodes in the second level can take the same color as their corresponding indicator, respectively.

The indicators 214 and 220 for the nodes 204 having the legend "PCR/Buffer Analysis" and 210 having the legend "Statistics" are depicted as being green to represent no alert condition having arisen in a lower level of the EPT since the last reset through and including the present moment. The indicators 212 and 216 for the nodes 202 having the legend "Auto Trigger" and 206 having the legend "PSIP Analysis" are depicted as being yellow to represent an alert condition having arisen in a lower level of the EPT since the last reset of the indictor 104 but which does not presently exist. Lastly, the indicator 218 for the node 208 having the legend "MPEG-2 Analysis" is depicted as being red to represent an alert condition that presently exists in a lower level node in the EPT. A different number of nodes in the second level $L_2$ corresponding to different components can be used according to the present invention.

As the alert condition (red) of the node 208 has the highest priority, the line segments 222, 223, 224 and 226 from the node 100 to the node 208 take on the red color corresponding to the state (red) of the indicator 218. This assists the viewer in quickly tracing the alert condition from the first level $L_1$ to the second level $L_2$. The line segments 228, 230, 232 and 234 take on the yellow color corresponding to the states (yellow) of the indicators 216 and 212, respectively. And line segments 238 and 240 take on the green color corresponding to the state of the indicator 220, and the line segment 236 take on the green color corresponding to the state of the indicator 214. To restate, the colors of the line segments are controlled by the relative priority of the states of the indicators to which the line segments connect. For instance, although all three red, green yellow colors are allocated to the line segment 222, the line segment 222 takes on the red color since it has the highest priority among the three colored states.

Figure 6:
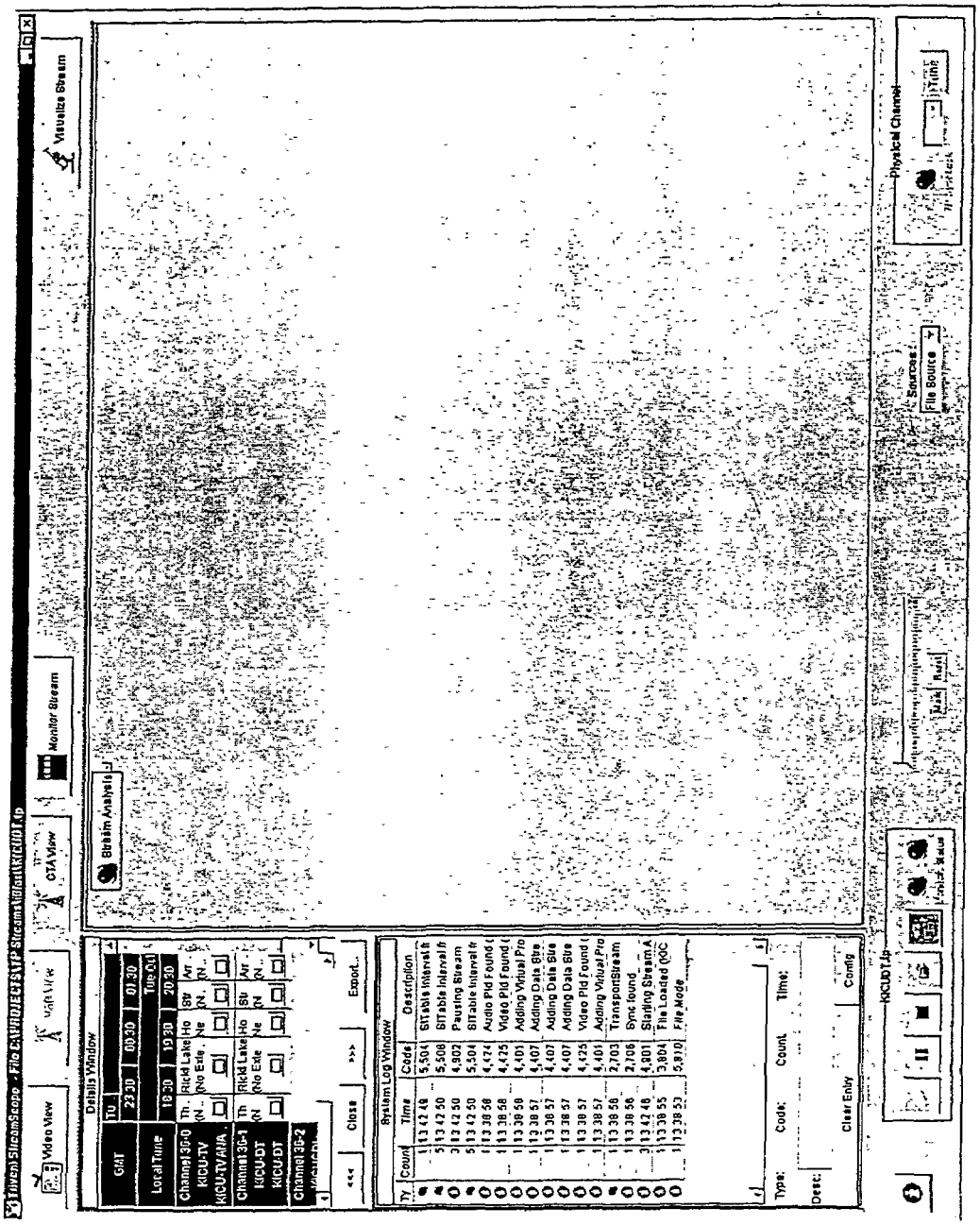
FIGS. 6–9 are different examples of screen images for different DTV signal samples, including an EPT and an associated hook window according to the embodiments of the invention.
Figure 7:
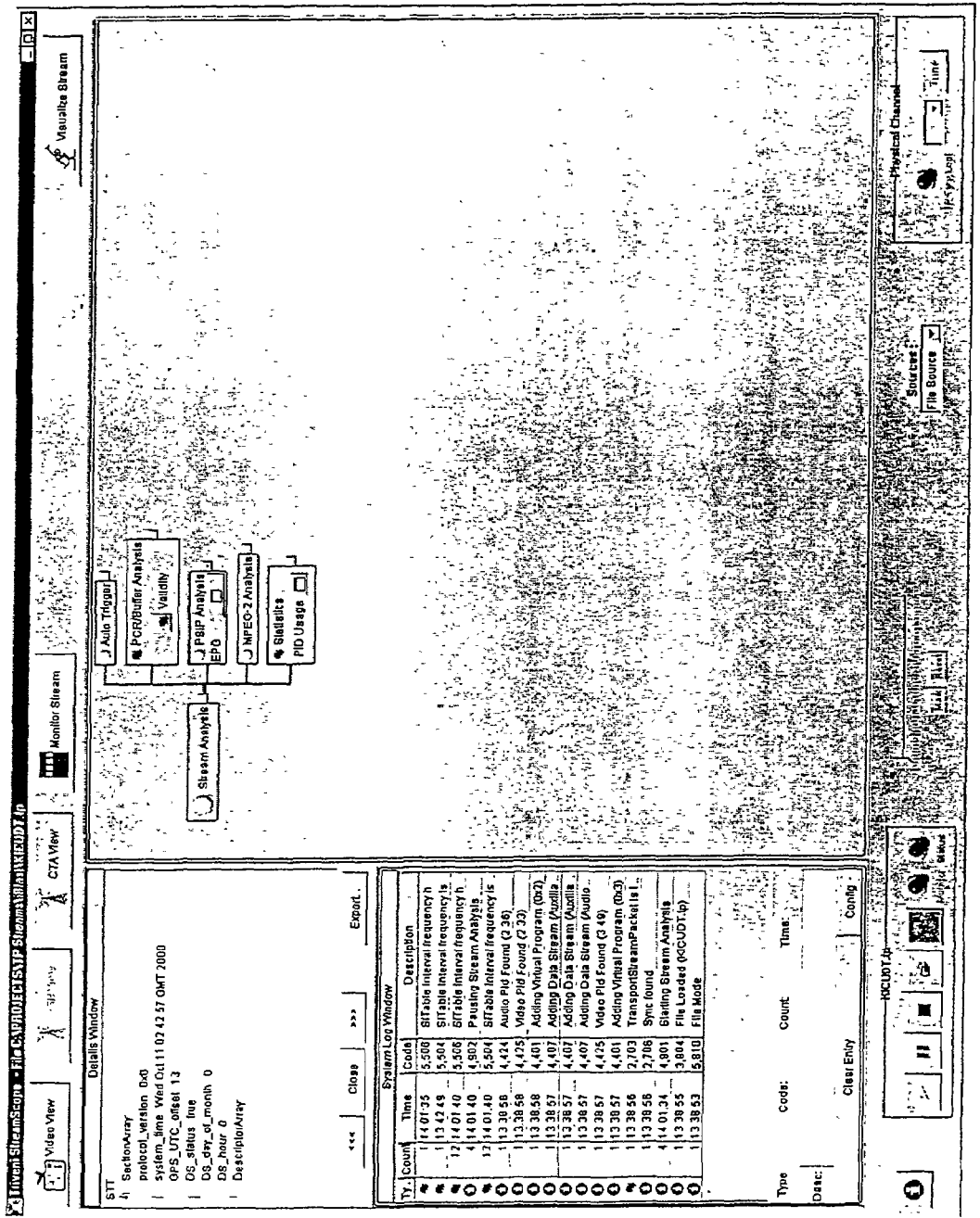
Figure 8:
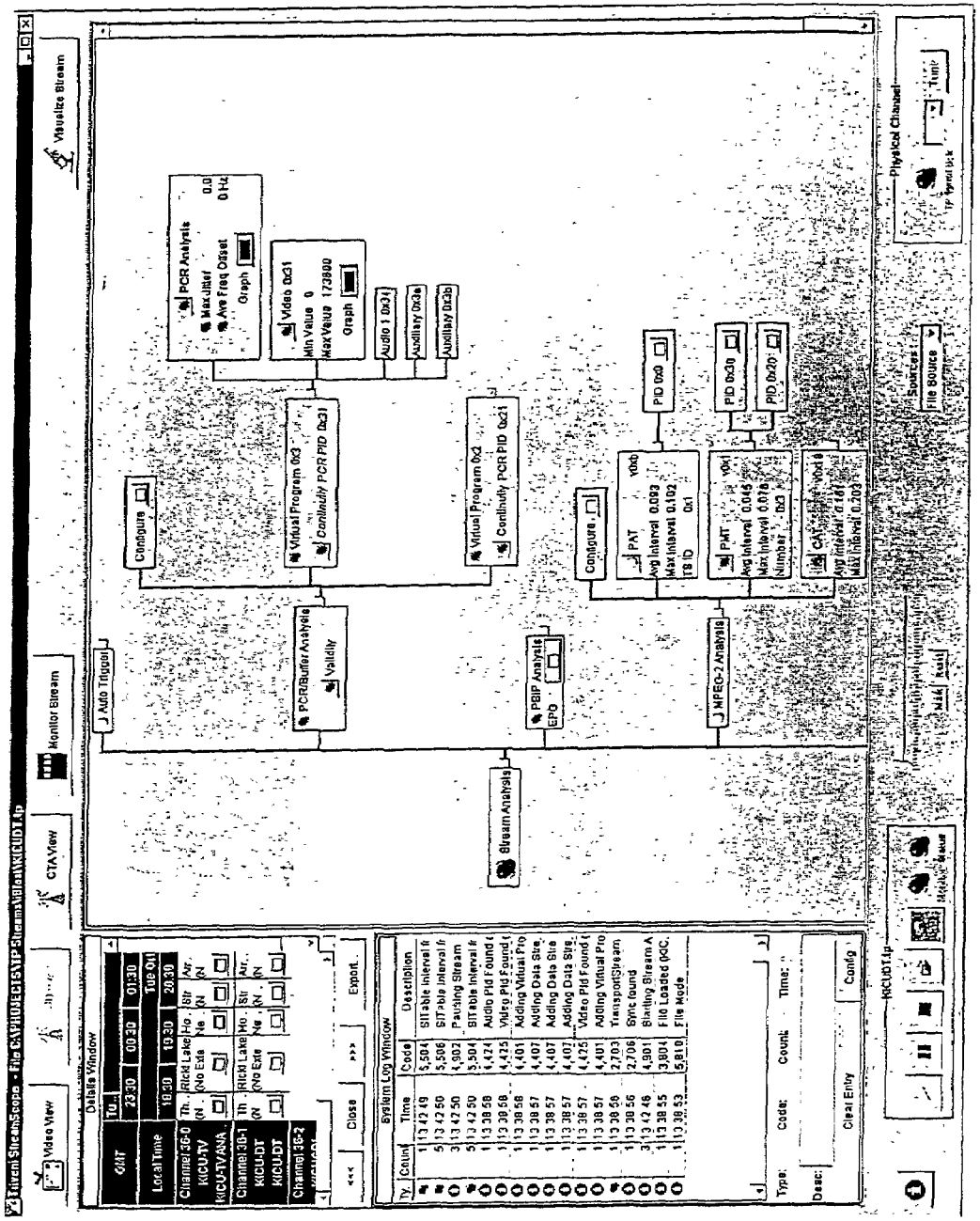
Figure 9:
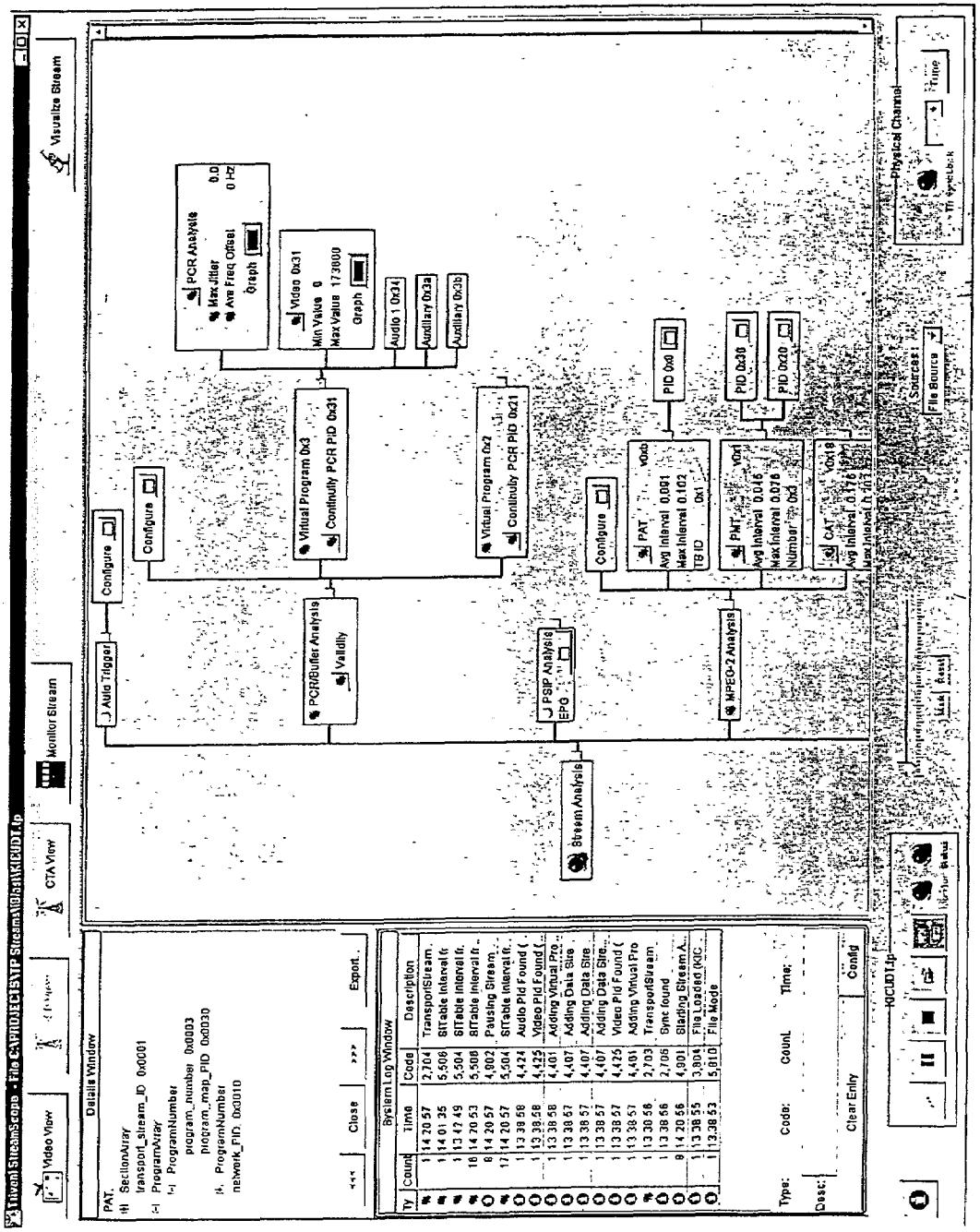
Figure 10:
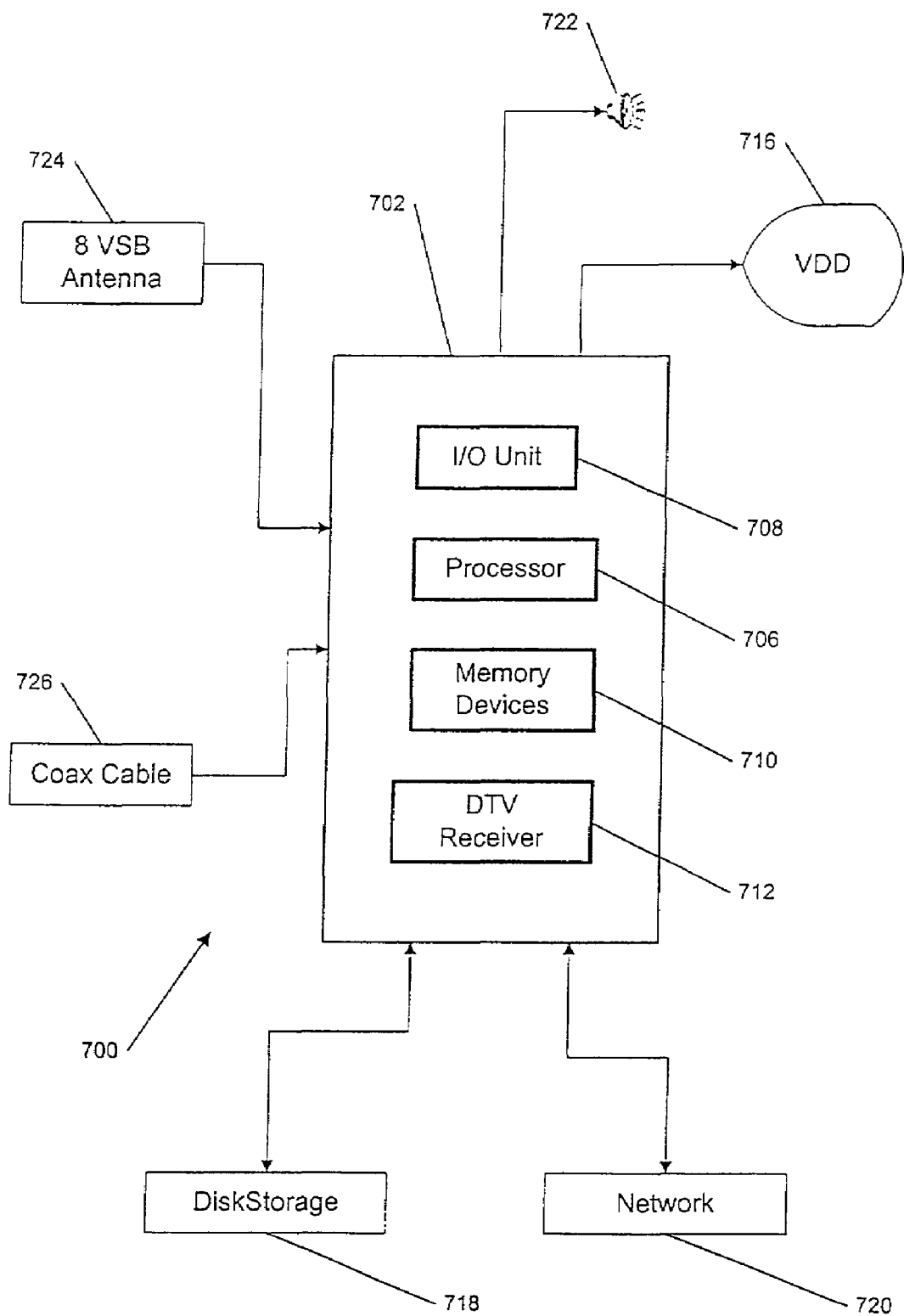
FIG. 10 is a functional block diagram of hardware and/or software usable to generate and display an EPT according to an embodiment of the present invention.

The nodes 206 and 210 include hook buttons 242 and 244 that have a caricature of a textual data display upon them. Clicking upon or activating the hook buttons 242 and 244 can cause a hook window (see the discussion of FIG. 6 below) to open in a predetermined area on a display screen that includes the EPT. In particular, clicking on the hook button 242 can cause an electronic program guide (EPG) to be displayed in the hook window. The generation of an EPG is well known. Clicking on the hook button 244 can cause a PID (acronym for packet identifier) usage graphic to be displayed in the hook window.

The node 204 is depicted as having a second indicator or validity indicator 246 associated with the legend "Validity." The validity indicator 246 is contained within a reset button 248. As its name implies, a reset button (such as 248) can reset the status of the associated indicator (such as 246 is associated with reset button 248) to the green alert status when clicked.

The validity indicator 246 indicates the status of the current node (node 204) only, whereas the status indicator 214 indicates the combined status of the current node (as indicated by the validity indicator 246) and its child nodes. For instance, if the status indicator 214 is green, this means that all child nodes of the node 204 and the validity indicator 246 are green. If the validity indicator 246 is red, then the status indicator 214 will be red because its validity check has failed. In this example, none of the child node indicators would be meaningful since the data (while the indicator 246 is red) being sent to the child node analysis engines are not valid. If the status indicator 214 is red while the validity indicator 246 is green, this means that at least one of its child nodes has detected some error. The status indicator 214 may not be green when the validity indicator 246 is not green, and the status indicator 214 may not be green when any of its child nodes is not green.

The hook buttons 242 and 244 correspond to the hook button 40 in FIG. 1, the validity indicator 246 corresponds to the validity indicator 42 in FIG. 1, and the reset button 248 corresponds to the reset button 41 in FIG. 1.

The auto trigger node 202 of FIG. 2B and its child node or leaf node 350 (FIG. 3A) represent functionalities of the monitoring/diagnostic device that include automatically recording a signal, activating one or both of an audible and a visual alarm, and automatically controlling a contact closure to occur in response to one or more trigger events. The indicator 212 of the auto trigger node 202 can take on a green alert state when no triggers have occurred since the last reset. The indicator 212 can also take on a red alert state if a trigger has occurred since the last reset. Lastly, the indicator 212 can take on a yellow alert state if a trigger event occurs and the current mode of the monitoring/diagnostic device precludes at least one automatic response to it.

Figure 2C:
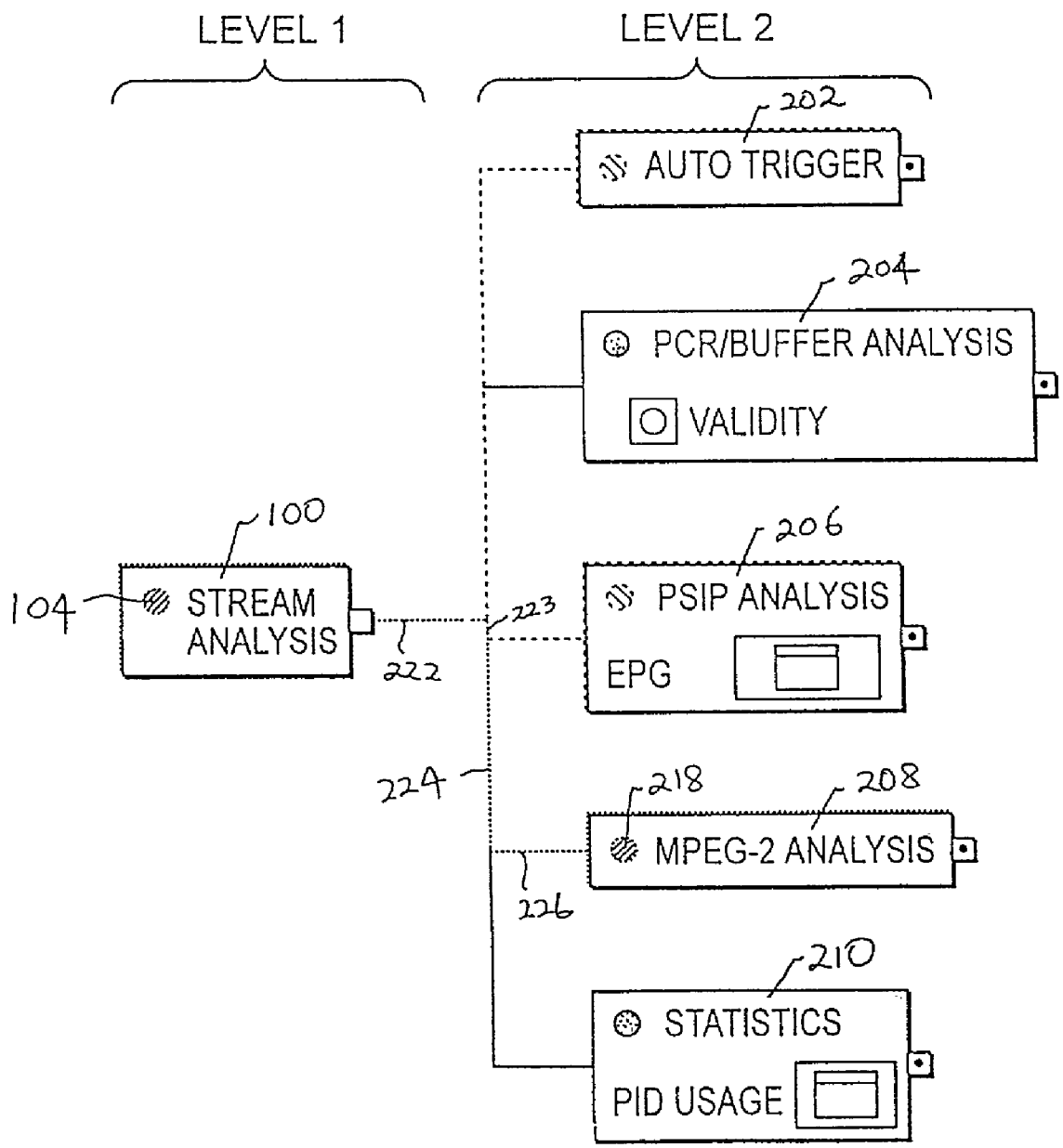
FIG. 2C shows the EPT of FIG. 2B with different error conditions represented.

FIG. 2C is a depiction of the EPT of FIG. 2B with different error conditions represented. As shown in FIG. 2C, as the state of the node 208 changes, the indicator 218 of node 208 takes on the yellow state from the previous red state. Correspondingly, the line segments 222, 223, 224 and 226 take on the yellow color corresponding to the states of the indicator 218 of node 208. The indicator 104 in the node 100 also takes on the yellow color because that is the highest priority being reported/indicated in the second level $L_2$ of the EPT. The left edges and top edges of the nodes 100 and 208 have correspondingly changed color from red to yellow.

Figure 3A:
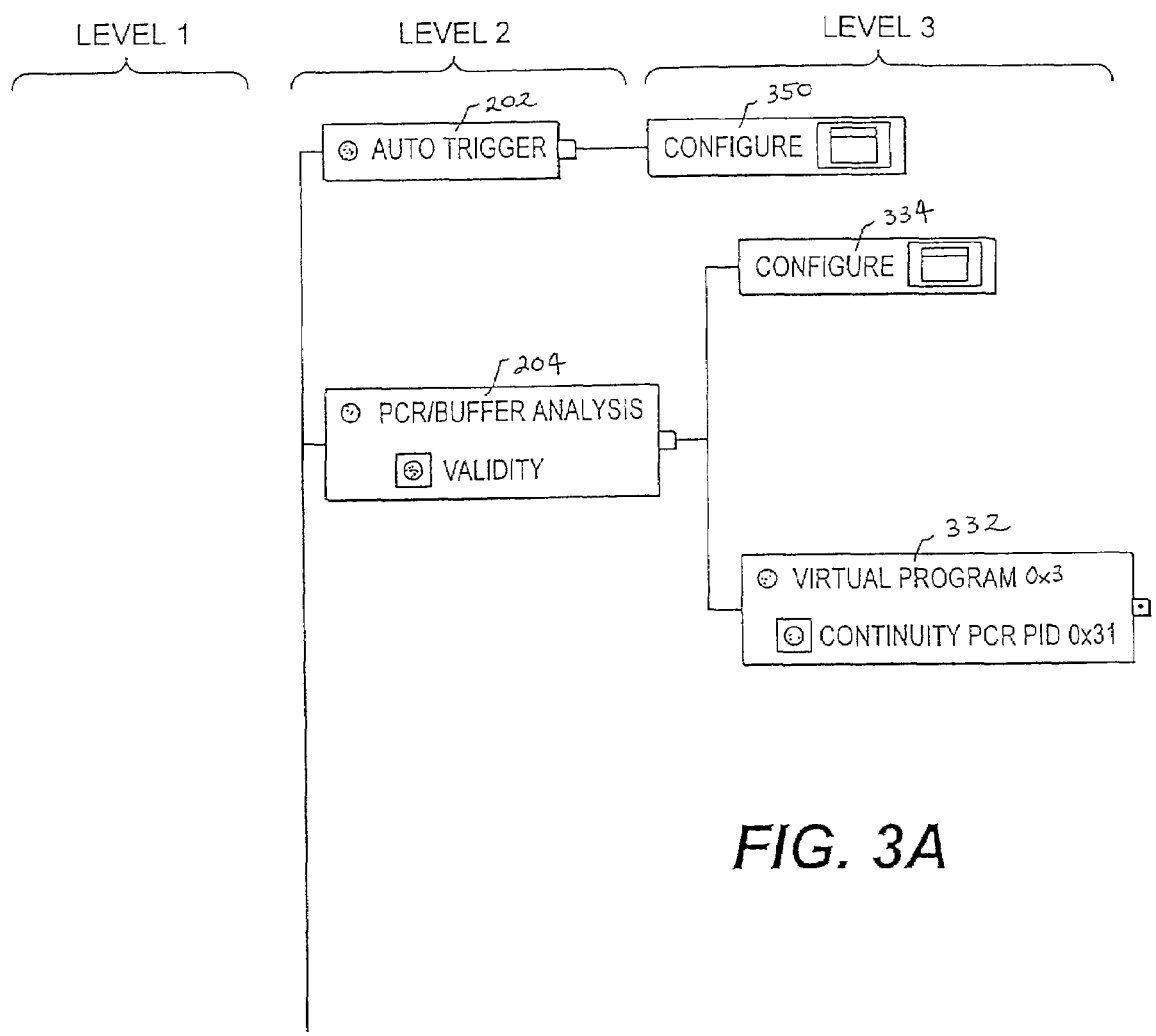
FIGS. 3A, 3B and 3C together show the EPT of FIG. 2B in the expanded form where first, second and third level ($L_1$, $L_2$ and $L_3$) nodes of the DTV analysis system are displayed with different error conditions represented.
Figure 3B:
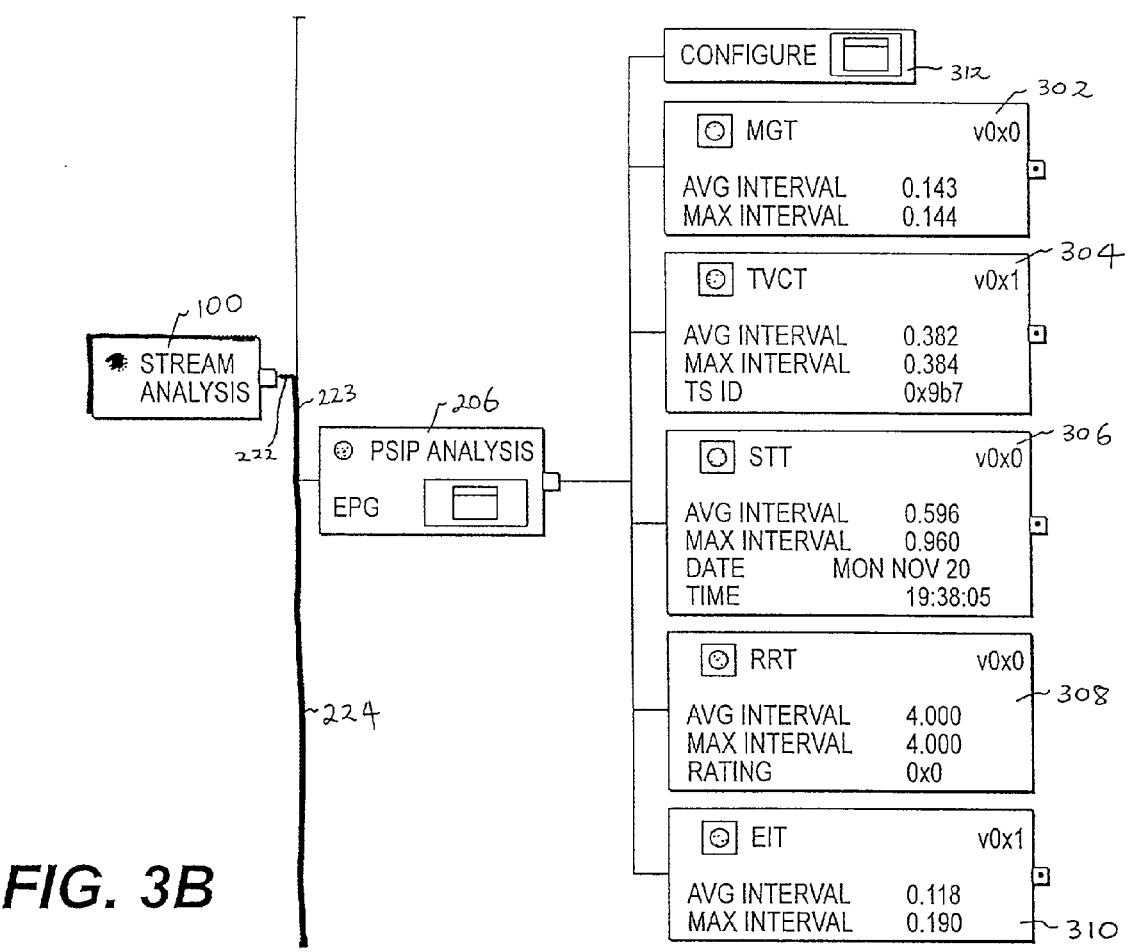
Figure 3C:
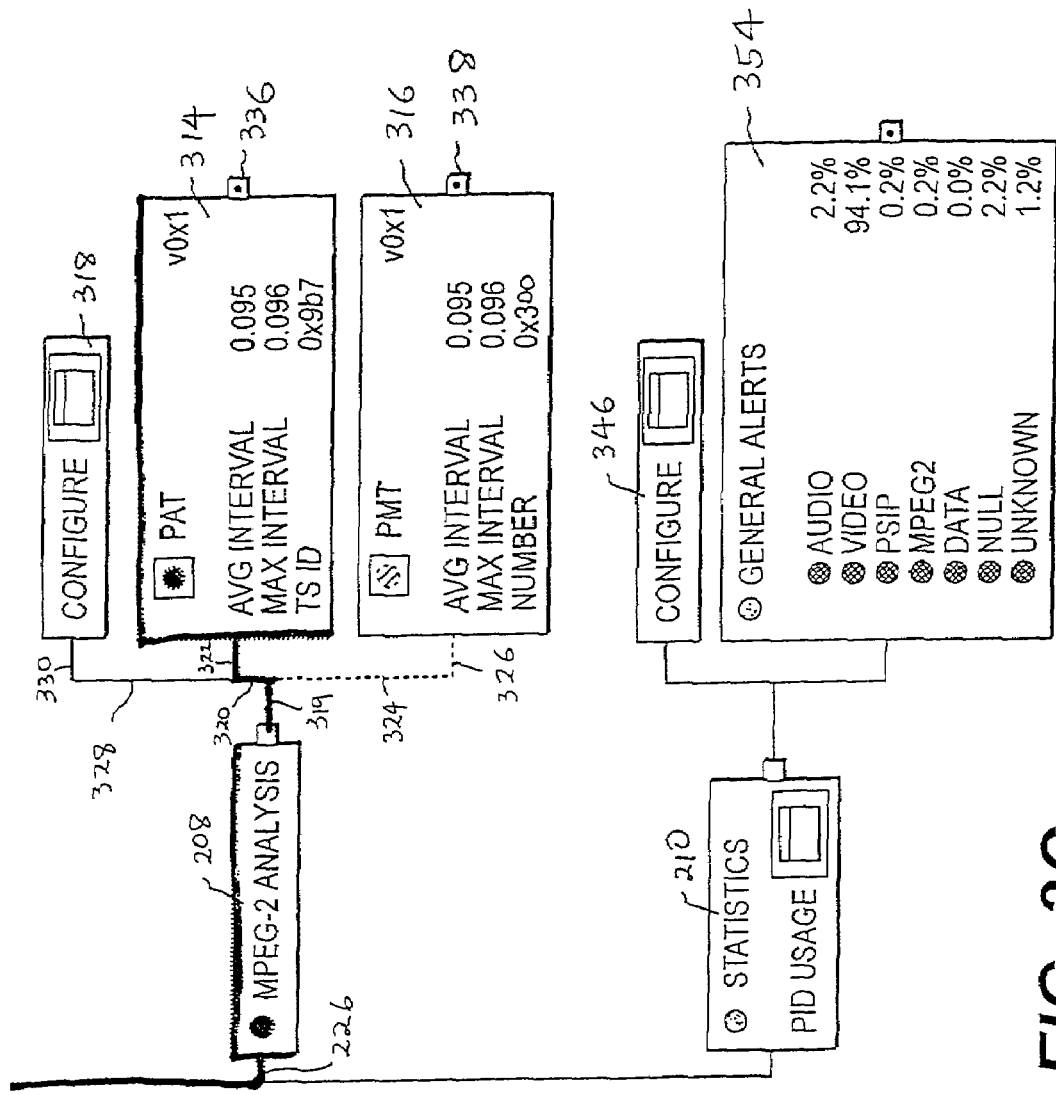
Figure 4A:
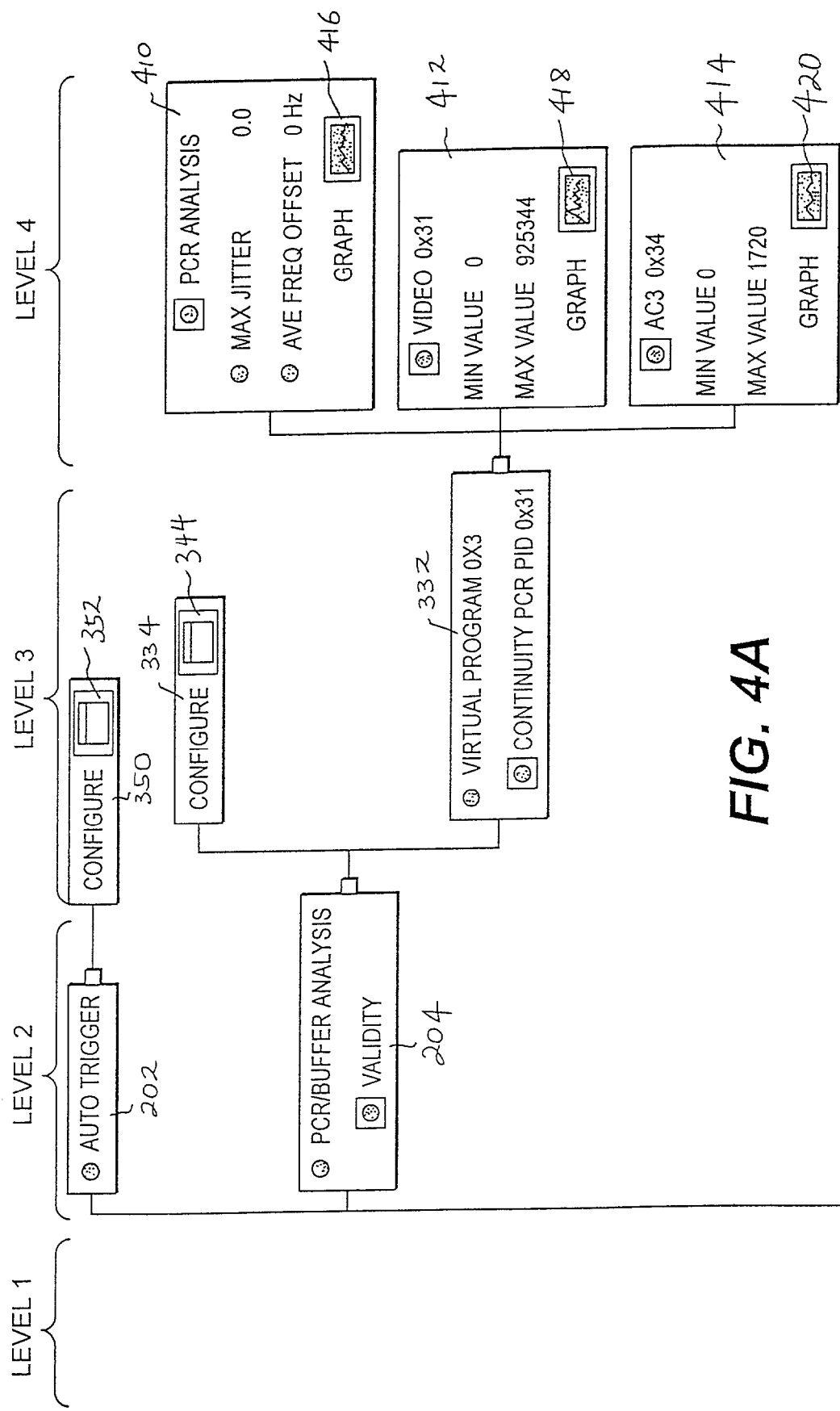
Figure 4C:
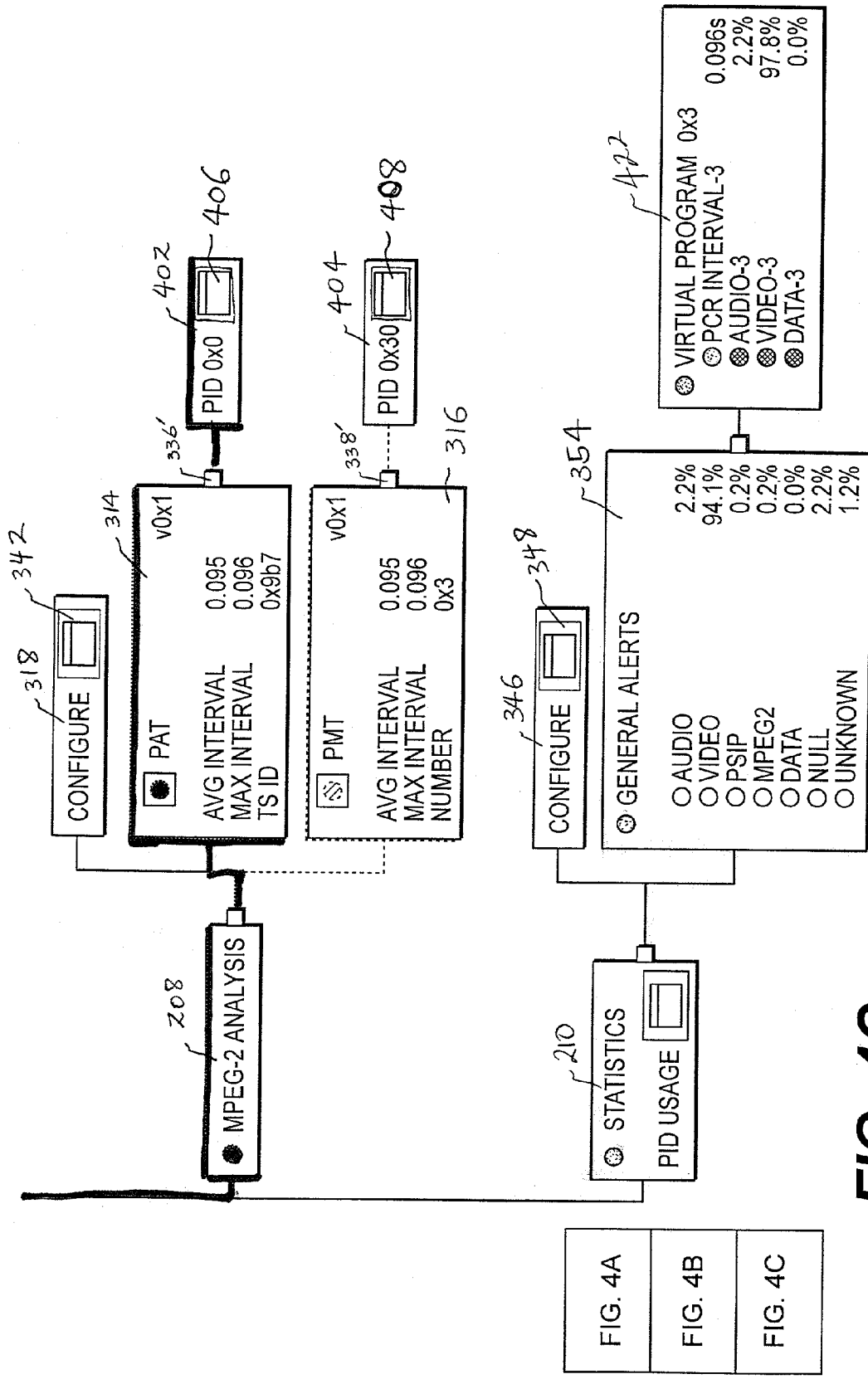

FIGS. 3A, 3B and 3C together are a depiction of the EPT of FIG. 2B in a further expanded form with first, second and third level ($L_1$, $L_2$ and $L_3$) nodes displayed, albeit with different error conditions represented, and FIGS. 4A, 4B and 4C together are a depiction of the EPT of FIGS. 3A–3C in still further expanded form with first through fourth level nodes displayed, all according to an embodiment of the present invention.

Referring to FIGS. 3A–3C, only node 208 has been depicted in the red alert state. Hence, line segments 222, 223, 224 and 226 are shown in red. And node 100 is shown in red because in it or in a node reporting to it (namely node 208) there presently exists a red alert condition. The nodes 202, 204, 206 and 210 have been depicted in the green alert state. Hence the remaining line segments between the nodes 202, 204, 206 and 210 are shown in green.

The third level $L_3$ node reporting to the Auto Trigger node 202 includes node 350 (having the legend "Configure"). The third level $L_3$ nodes reporting to the PCR/Buffer Analysis node 204 include node 332 (having the legend "Virtual Program 0x3") and node 334 (having the legend "Configure"). The third level $L_3$ nodes reporting to the PSIP Analysis node 206 include node 302 (having the legend "MGT," the acronym for master guide table), node 304 (having the legend "TVCT," the acronym for terrestrial virtual channel table), node 306 (having the legend "STT," the acronym for system time table), node 308 (having the legend "RRT," the acronym for region rating table) node 310 (having the legend "EIT," the acronym for event information table) and node 312 (having the legend "Configure"). The third level $L_3$ nodes reporting to the MPEG-2 Analysis node 208 include node 314 (having the legend "PAT," the acronym for program allocation table), node 316 (having the legend "PMT," the acronym for program map table) and node 318 (having the legend "Configure"). The third level $L_3$ nodes reporting to the Statistics node 210 includes node 346 (having the legend "Configure") and node 354 (having the legend "General Alerts").

In this example, the third level $L_3$ node 314 (reporting to node 208) is depicted in the red alert state, which has caused the node 208 to be depicted in the red alert state, and which in turn has caused the node 100 to be depicted in the red alert state. The line segments 319, 320 and 322 between nodes 314 and 208 are also depicted in the red alert state. The third level $L_3$ node 316 is depicted in the yellow alert state. As a result, the line segments 324 and 326 between the nodes 316 and 208 are depicted in the yellow alert state. The configure node 318 (to be discussed in more detail below) does not take on an alert state, hence the line segments 328 and 330 have been depicted in black as has the left edge and top edge of the configure node 318. The nodes 314 and 316 in FIG. 3C have expansion buttons 336 and 338, respectively.

Referring to FIG. 4A, node 332 is shown in the expanded state with node 410 (having the legend "PCR Analysis," PCR being the acronym for program clock reference), node 412 (having the legend "Video 0x31") and node 414 (having legend "AC3 0x34") reporting to it. In this example, nodes 410, 412 and 414 are depicted in the green alert state, as are the lines connecting them to node 332. Nodes 410, 412 and 414 may include, respectively, hook buttons 416, 418 and 420 that each bear a caricature of a waveform or some other graphics. Clicking on or activating the hook button 416 may cause a graphic of the PCR analysis to be displayed in a hook window. Clicking on the hook button 418 may cause the video image to be displayed in a hook window. Clicking on the hook button 420 may cause a graphic of the audio buffer usage to be displayed in a hook window.

In FIG. 4B, an expansion button has not been depicted for node 308. In contrast, each of nodes 302, 304, 306 and 310 have an expansion button. The absence of an expansion button for the node 308 or any other appropriate node indicates that the corresponding table, e.g., RRT for node 308, has not been received in the DTV packet multiplex being analyzed, hence no fourth level $L_4$ node has been depicted as reporting to node 308.

For simplicity, only a single node 424 has been depicted in FIG. 4B for the TVCT node 304. But it should be noted that that the expansion button for the TVCT node 304 can expand to multiple lower level nodes if multiple TVCTs are defined by the MGT. Similarly, any node in the EPT of the present invention may expand to one or more next lower level nodes if needed.

The configure nodes 312, 318, 334, 346 and 350 can control what analysis engines will be enabled, and in some instances, permit some parameters of the analyses to be set. Hence, a configure node controls what nodes will be depicted as reporting to the next highest level node in the EPT.

For example, configure node 312 in FIG. 4B includes a button 340 that, when clicked, opens a dialog window (not depicted) that permits a user to turn on/off the analysis engine that monitors compliance with the issuance intervals defined for the other node components such as MGT, TVCT, STT, RRT, EIT, etc. Also, the dialog window can permit the user to customize the interval definitions, but can default to those set by the American Television Standards Committee (ATSC) or other predetermined parameters. A button 342 of the configure node 318 in FIG. 4C may open a similar dialog window as the configure node 312.

The configure node 334 in FIG. 4A includes a button 344 that, when clicked, opens a dialog window (not depicted)

that can permit a user to turn on/off certain analysis engines. For example, these can include, but are not limited to, a continuity count checking engine, PCR/Jitter analysis engine, video buffer underflow/overflow analysis engine, audio buffer underflow/overflow analysis engine.

The configure node 346 in FIG. 4C includes a button 348 that, when clicked, opens a dialog window (not depicted) that can permit a user to turn on/off certain analysis engines that produce alerts when certain types of packets (e.g., audio, video, PSIP tables, MPEG-2, data, null, unknown, etc.) exceed user-defined or default thresholds. The alerts can be set for an aggregate of all monitored virtual programs and a different set of alerts can be set for individual virtual programs. In the present example, node 422 in FIG. 4C presents PID usage information for a single virtual program 0x3 using a different set of alerts than represented by the node 354.

The configure node 350 in FIG. 4C includes a button 352 that, when clicked, opens a dialog window (not depicted) that permits a user to turn on/off analysis engines that recognize trigger events; and responses associated with the triggering event. The dialog window also permits the user to set parameters that the analysis engines use to recognize the trigger events. A particular example of a response to a trigger event can include paging/communicating with a technician. Examples of events to automatically trigger recording of the DTV signal, that can be selected via dialog window activated by the button 352, include, but are not limited to: the audio buffer being out of bounds; a reset of the video buffer analysis engine; the audio buffer being back in bounds; the video buffer being out of bounds; the video buffer being back in bounds; PCR jitter being out of bounds; PCR jitter being back in bounds; PCR frequency offset being out of bounds; PCR frequency offset being back in bounds; an audio PID being found; an error reading a properties file; an error reading a product information file; encountering a MainFrame already registered; an error shutting down a listener; a DTVControlComponent dequeueEvent interrupted while waiting for event; a DTVControlEventNotifier ThreadDeath; a Disabling of lip sync; and a DTVPlayer.getChannelValue NumberFormatException.

Still referring to FIG. 4C, as before, clicking on one of the expansion buttons will open a fourth level $L_4$ node. For instance, clicking on one of the expansion buttons 336 and 338 will open a fourth level node 402 (having the legend "PID 0x0") or node 404 (having the legend "PID 0x30")g. 4C. The expansion buttons 336 and 338 are correspondingly shown in the expanded states (without the dot in the center) as item nos. 336' and 338'.

The left edge and top edge of the fourth level $L_4$ node 402 are shown in the red alert state as is the line connecting node 402 to node 314. Similarly, the left edge and top edge of the fourth level $L_4$ node 404 are shown in the yellow alert state as is the line connecting node 404 to node 316. Again, the red alert state of node 402 is reported up to node 100 via nodes 314 and 208. The yellow alert state of node 404 is reported to node 316 but is not as high a priority as the red alert state of node 402, hence node 208 takes on the red alert state rather than the yellow alert state. The fourth level $L_4$ nodes 402 and 404 may include hook buttons 406 and 408, respectively. As discussed above, clicking on one of these hook buttons can cause the contents of the associated packet to be displayed in a hook window.

Figure 5:
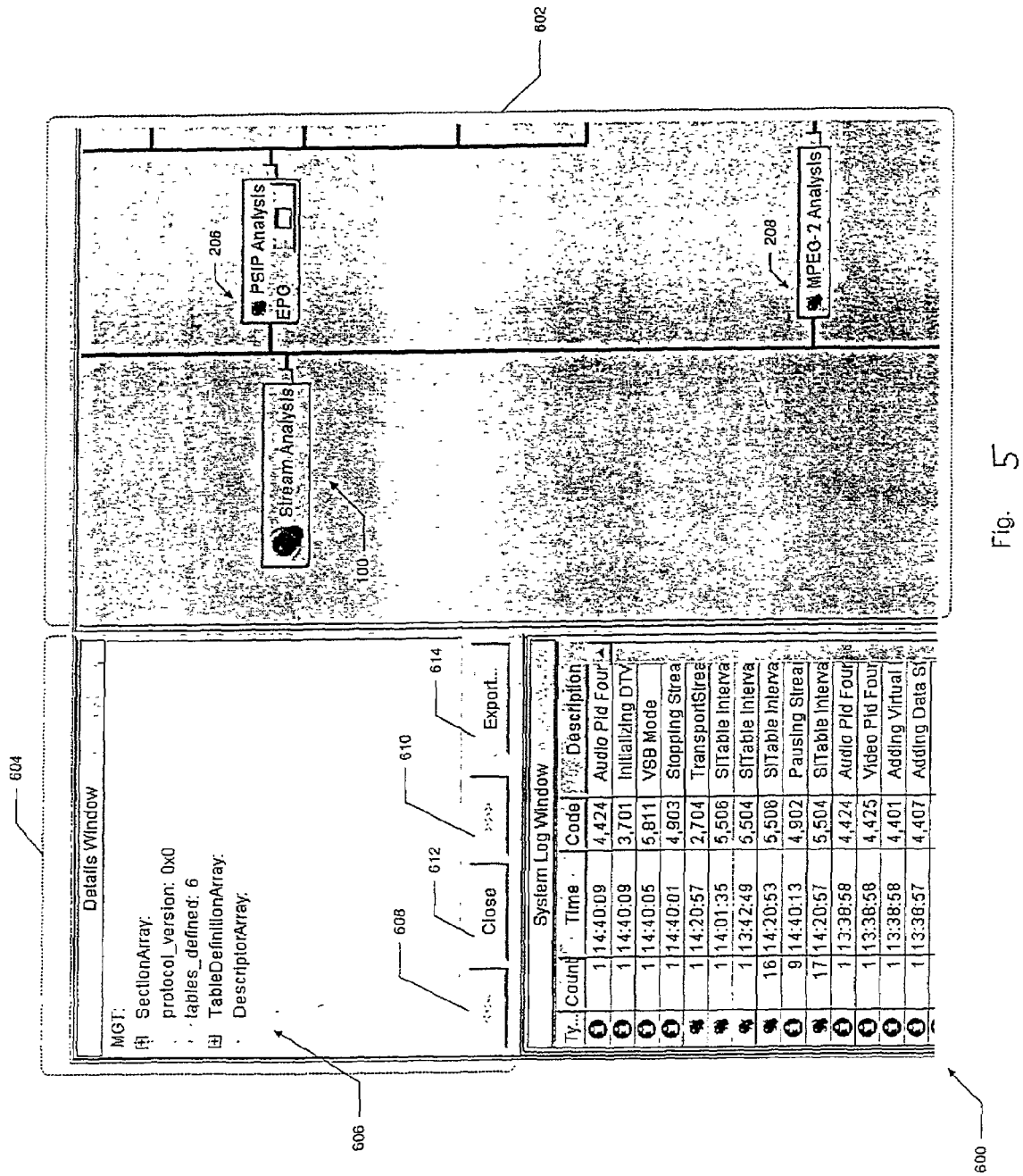

FIG. 5 shows an example of a screen image showing at least a portion of the EPT of FIGS. 2A–4C, including an example of a hook window 604 displayed in response to the actuation of a hook button discussed above, according to an embodiment of the present invention. In this example, the hook window 604 is shown in the partial image 600 of a monitoring/diagnostic device display screen that includes a partial EPT 602 (showing nodes 100, 206 and 208). The example contents 606 being depicted in the hook window 604. Once the hook window 604 is opened, it will stay open until the close button 612 is clicked. If, for example, a hook button has been clicked and then a new hook button is clicked before the existing hook window 604 was closed, the new hook window corresponding to the new hook button is laid over the previous hook window. Clicking upon the backward button 608 and the forward button 610 permits navigation between multiple hook windows. An export button 614 is provided to permit the contents in the currently displayed hook window, i.e., the one on top, to be exported, e.g., to a file to be saved.

FIGS. 6–9 are alternate images depicting information about different DTV signal samples of a display screen including an EPT and an associated hook window according to an embodiment of the invention. These figures are provided merely to present different examples of the present invention, and thus, the detailed discussion thereof is omitted.

A digital television (DTV) diagnostic instrument (and the software embodied therein) that can display the EPT according to the embodiments of the present invention can use known hardware programmed according to the invention. An example of such hardware and/or software is depicted in FIG. 11 as a system 700. The system 700 of FIG. 11 includes a computer/controller 702 having input/out circuitry 708, a processor 706, one or more memory devices 710 and a DTV receiver 712, all operatively coupled. The computer 702 is operatively connected to a radio frequency (RF) antenna 724 and/or to a coaxial cable 726 via which the computer 702 receives, e.g., an 8 vestigial side band (VSB) signal. The output of the diagnostic instrument is provided to an audio output unit 722 and/or a video display device (VDD) 716 such as a liquid crystal display (LCD) device or cathode ray tube (CRT). Portions of DTV signals received via the antenna 724 and/or the coaxial cable 726 can be saved to or retrieved from a storage unit 718 such as a disk storage and/or from a network 720 via a connection such as an ethernet connection. The system 700 can also be configured to be easily portable.

In one embodiment, the DTV receiver 712 can be, e.g., DTVCARD A1000 model of circuit board manufactured and sold by TRIVENI DIGITAL INC. The processor 706 can be of the PENTIUM family of processors sold by INTEL INC., e.g., a 450 MHz PENTIUM III processor, preferably running a WINDOWS 98 operating system manufactured and sold by the MICROSOFT CORPORATION in the case where the DTV A1000 card is employed as the DTV receiver 712. Examples of portable computers with expansions slots to accommodate the DTV A1000 card (among others) are the PAC series of rugged portable computers, e.g., the FLEX-PAC and the LPAC, manufactured by DOLCH COMPUTER SYSTEMS, INC. It should be noted that transport streams can be input to the hardware/software by any means, and not necessarily via the DTV card. Other ways of delivering the transport streams may be by, e.g., TCP/IP (or UDP), file based input, other physical devices such as ASI & SMPTE 310 cards, USB and PCMCIA.

The analysis engines employed to generate the data by which the nodes take on one of the alert states, e.g., red alert, yellow alert or green alert, are known. For example, they can be found in the STREAMSCOPE family of Real-Time Monitors and Analyzers for ATSC MPEG-2 Transport Streams, manufactured and marketed by TRIVENI DIGITAL INC. Such analysis engines can be augmented or modified to display the alert states in an EPT fashion according to the present invention using known hardware and/or computer programming. Any known computer program language may be used in the present invention to implement the invention.

In the present invention, each node in the Error Propagation Tree (EPT) reports the worst error status of any of its children. This can be done in one of two ways. The first way is to have a child node recursively report its current status up to the parent and to have the parent keep a state of all of its children and determine if its state (the parent's) has changed by the notification from its child. Then the parent can send notification of its change up to its parent (the grandparent of the children nodes). An advantage to this method is that there is not much checking that needs to be done. A disadvantage is that if not implemented correctly, parents can lose synchronization with children.

The second way is to have a child node recursively inform its parent whether the child node has changed states. Each successive parent node continues to propagate this information (namely, news of a state change) up until the root node level, then recursively queries its children for their new state to determine whether its own state has changed and, if so, how. An advantage of this method is that it will never be out of synchronization with its children. A disadvantage of this method is that the node needs to query all of its children every time a state has changed. Any known techniques, software, and/or hardware can be used to implemented the first and second ways by one skilled in the art.

According to the present invention, the EPT technique can be used to analyze any system, product or signal and the EPT can have any number of nodes and levels corresponding to the components and structure of the system, product or signal to be analyzed. As a result, the EPT provides an effective and powerful way to quickly analyze and diagnose the conditions and/or errors in the entity being examined.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A method of providing condition information associated with an entity being analyzed, the method comprising:
    presenting nodes corresponding to components of the entity according to a tree-form configuration; and
    providing condition information associated with at least one of the components using the nodes,
    wherein providing the condition information comprises:
    propagating a highest alert state out of different states of child node(s) to a corresponding parent node; and
    providing both a status indicator and a validity indicator to each node, said status indicator taking on the highest alert state out of different states of its child node(s) and said validity indicator indicating a status of only a respective node.

2. The method of claim 1, wherein the presenting step includes:
    providing an expansion activator to at least one of the nodes, wherein said one node is expanded to show said one node and its next child node(s) upon an actuation of the expansion activator.

3. The method of claim 2, wherein the step of providing the condition information includes:
    displaying at least portions of the nodes in different colors, shapes, and/or configurations to provide the condition information.

4. The method of claim 3, wherein the step of providing the condition information further includes:
    displaying connection lines that are used to connect the nodes, in the same colors, shapes, and/or configurations used in displaying the at least portions of the nodes to provide the condition information.

5. The method of claim 4, wherein, in the step of displaying the connection lines, each node and its connection line take on the highest alert state out of different states of its child node(s).

6. The method of claim 1, wherein the presenting step includes:
    providing at least one of a reset switch, and a hook button or switch to at least one of the nodes, wherein the hook button or switch triggers provision of additional information about the associated node.

7. The method of claim 1, wherein the entity is a digital television (DTV) broadcast system and the condition information represents error information in the DTV broadcast system.

8. The method of claim 1, wherein the nodes are dynamic nodes.

9. A method of displaying system information, the method comprising:
    displaying at least one first-level node representing a first-level of information associated with said system;
    providing a switch associated with said at least one first-level node; and
    providing condition information associated with at least one of the components using the nodes,
    wherein providing the condition information comprises:
    propagating a highest alert state out of different states of child node(s) to a corresponding parent node; and
    providing both a status indicator and a validity indicator to each node, said status indicator taking on the highest alert state out of different states of its child node(s), and said validity indicator indicating a status of only a respective node, wherein an actuation of said switch causes at least one associated next-level node to be displayed.

10. The method of claim 9, further comprising:
    dynamically providing any number of nodes in n-levels to provide the system information using the nodes.

11. The method of claim 10, further comprising:
    dynamically displaying at least portions of the nodes in different colors, shapes, and/or configurations according to the system information.

12. The method of claim 11, further comprising:
    dynamically displaying connection lines that are used to connect the nodes, in the same colors, shapes, and/or configurations used in displaying the at least portions of the nodes according to the system information.

13. The method of claim 10, further comprising:
    providing at least one of a reset switch, and a hook button or switch to at least one of the nodes,
    wherein the hook button or switch triggers provision of additional information about the associated node.

14. A system for providing condition information associated with an entity being analyzed, the system comprising:
    means for presenting nodes corresponding to components of the entity according to a tree-form configuration; and means for providing condition information associated with at least one of the components using the nodes,
wherein the means for providing condition information comprises:
means for propagating a highest alert state out of different states of child node(s) to a corresponding parent node; and
means for providing both a status indicator and a validity indicator to each node, said status indicator taking on the highest alert state out of different states of its child node(s), and said validity indicator indicating a status of only a corresponding node.

15. The system of claim 14, wherein the means for presenting includes:
means for providing an expansion activator to at least one of the nodes,
wherein said one node is expanded to show said one node and its next child node(s) upon an actuation of the expansion activator.

16. The system of claim 15, wherein the means for providing the condition information includes:
means for displaying at least portions of the nodes in different colors, shapes, and/or configurations to provide the condition information.

17. The system of claim 16, wherein the means for providing the condition information further includes:
means for displaying connection lines that are used to connect the nodes, in the same colors, shapes, and/or configurations used in the means for displaying the at least portions of the nodes to provide the condition information.

18. The system of claim 17, wherein, when the condition information is provided, each node and its connection line take on the highest alert state out of different states of its child node(s).

19. The system of claim 14, wherein the means for presenting includes:
means for providing at least one of a reset switch, and a hook button or switch to at least one of the nodes, wherein the hook button or switch triggers provision of additional information about the associated node.

20. The system of claim 14, wherein the entity is a digital television (DTV) broadcast system and the condition information represents error information in the DTV broadcast system.

21. The system of claim 14, wherein the nodes are dynamic nodes.

22. A computer program product embodied on a computer readable medium, for providing condition information associated with an entity being analyzed, the computer program product comprising computer executable instructions for:
presenting nodes corresponding to components of the entity according to a tree-form configuration; and
providing condition information associated with at least one of the components using the nodes,
wherein providing the condition information comprises:
propagating a highest alert state out of different states of child node(s) to a corresponding parent node; and
providing both a status indicator and a validity indicator to each node, said status indicator taking on the highest alert state out of different states of its child node(s), and said validity indicator indicating a status of only a respective node.

23. The computer program product of claim 22, wherein the computer executable instructions for presenting include computer executable instructions for:
providing an expansion activator to at least one of the nodes, wherein said one node is expanded to show said one node and its next child node(s) upon actuation of the expansion activator.

24. The computer program product of claim 23, wherein the computer executable instructions for providing the condition information include computer executable instructions for:
displaying at least portions of the nodes in different colors, shapes, and/or configurations to provide the condition information.

25. The computer program product of claim 24, wherein the computer executable instructions for providing the condition information further include computer executable instructions for:
displaying connection lines that are used to connect the nodes, in the same colors, shapes, and/or configurations used in displaying the at least portions of the nodes to provide the condition information.

26. The computer program product of claim 25, wherein each node and its connection line take on the highest alert state out of different states of its child node(s).

27. The computer program product of claim 22, wherein the computer executable instructions for presenting include computer executable instructions for:
providing at least one of a reset switch, and a hook button or switch to at least one of the nodes, wherein the hook button or switch triggers provision of additional information about the associated node.

28. The computer program product of claim 22, wherein the entity is a digital television (DTV) broadcast system and the condition information represents error information in the DTV broadcast system.

29. The computer program product of claim 22, wherein the presented notes are dynamic nodes.

* * * * *